Figure 1:
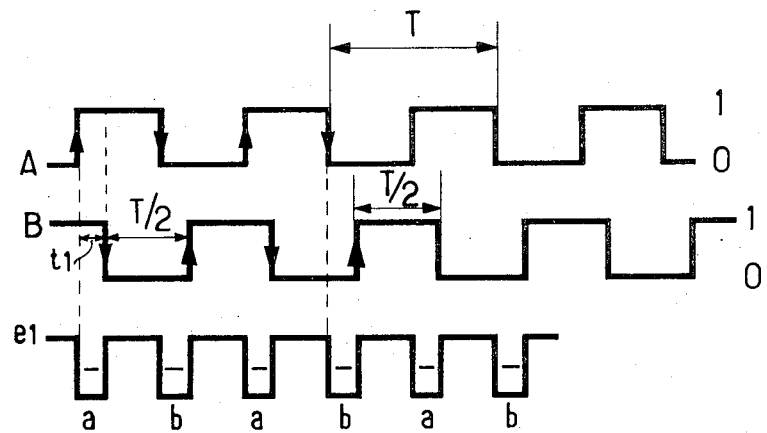

United States Patent [19]

Salle et al.

[11] 3,728,624
[45] Apr. 17, 1973

[54] PHASE METER FOR COMPARING RECTANGULAR WAVES

[75] Inventors: Yves Salle, Boulonge; Marcel Pincemin, Ris Orangis, both of France

[73] Assignee: Compagnie Industrial Des Telecommunications, Cit-Alcatel, Paris, France

[22] Filed: Feb. 25, 1972

[21] Appl. No.: 229,338

[52] U.S. Cl. ............................324/83 A, 328/109
[51] Int. Cl. ............................................G01r 25/00
[58] Field of Search ............... 324/83 R, 83 A, 83 D; 307/210, 232; 328/133, 109

[56] References Cited
UNITED STATES PATENTS 3,482,132  12/1969  Emde .................................. 307/210
3,551,808  12/1970  Grossimon et al. ............. 324/83 D X

*Primary Examiner*—Alfred E. Smith
*Attorney*—Paul M. Craig, Jr. et al.

[57] ABSTRACT

A large-band phase meter operating by the evaluation of displaced rectangular waves being applied to phase measurements, particularly between two waves having the same frequency but different cyclic ratios furnishing measurements independent of the cyclic ratio.

7 Claims, 6 Drawing Figures

PHASE METER FOR COMPARING RECTANGULAR WAVES

The present invention relates in general to the field of large-band phase meters.

It is directed more particularly to a phase meter which operates by evaluation of shifted rectangular pulse waveforms and has application to phase measurements, particularly between two waves having the same frequency but different cyclic ratios.

It is known in the art to construct phase meters which operate by means of an evaluation of the angular separation between the zero crossing of the rising fronts of two waves, for example, two waves having the same frequency and being offset in phase with respect to each other. In practice the measurement is carried out on rectangular pulse waveforms which are obtained by amplification and amplitude limiting of the two waves to be phase metered. This method produces correct results, if, from two sinusoidal waves, one obtains two rectangular waves with cyclic ratios of 1/1, or at least ratios which are equal with respect to each other. But this is an ideal case which is rarely obtained in practice.

In actual fact, the waves which arrive at the phase meter in the conventional case have hypothetically followed different paths, and have undergone various manipulations susceptible to more or less altering their characteristics, which is the reason why, in a large number of cases, the rectangular waves which the phase meter receives do not have cyclic ratios of 1/1 or ratios which are equal to each other.

In order to obtain a correct measurement of the phase shift in spite of these frequency encountered unfavorable conditions, the present invention has recourse to simple logic means actuated by the forward and backward fronts of the rectangular waves to be compared to provide an accurate phase measurement.

Figure 2:
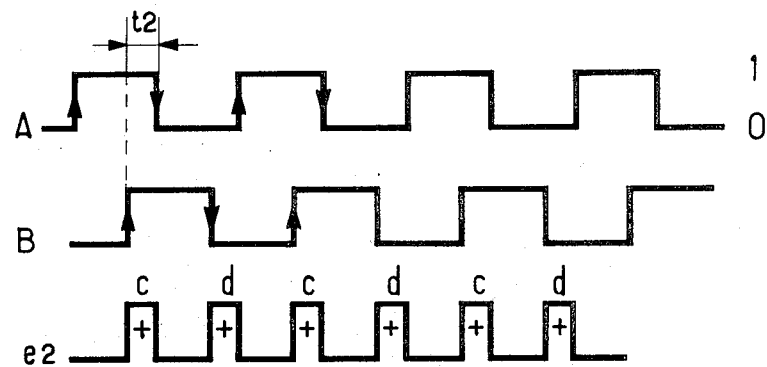
Figure 3:
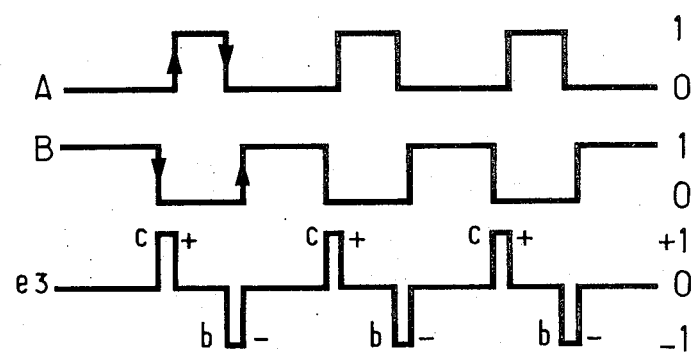
Figure 4:
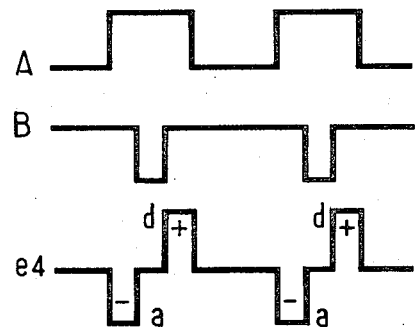
Figure 5:
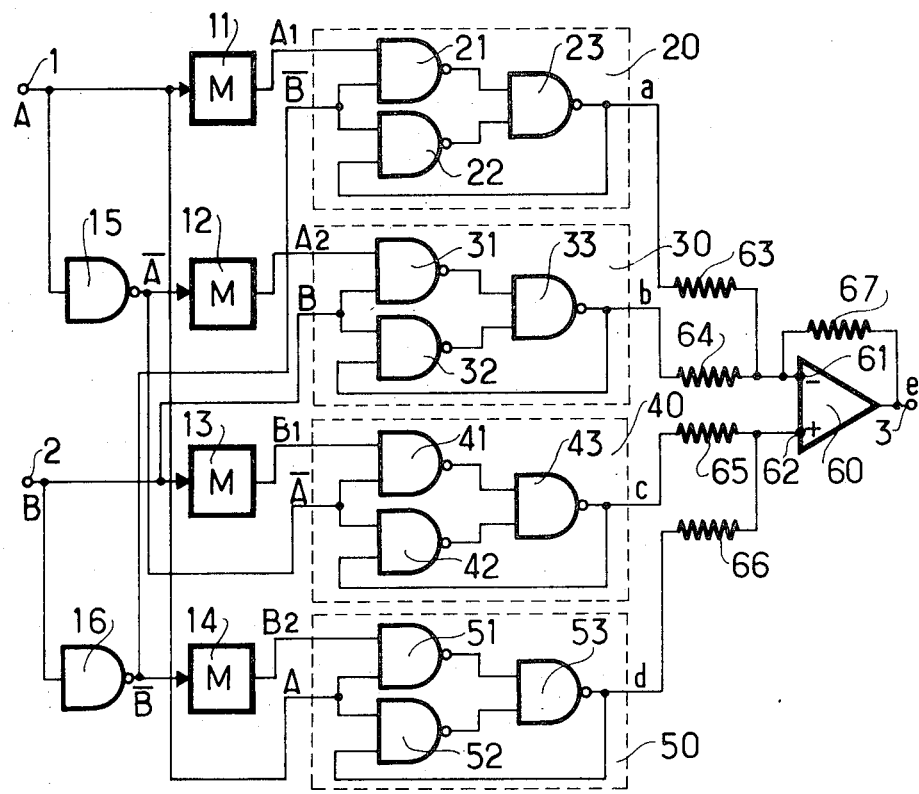
Figure 6:
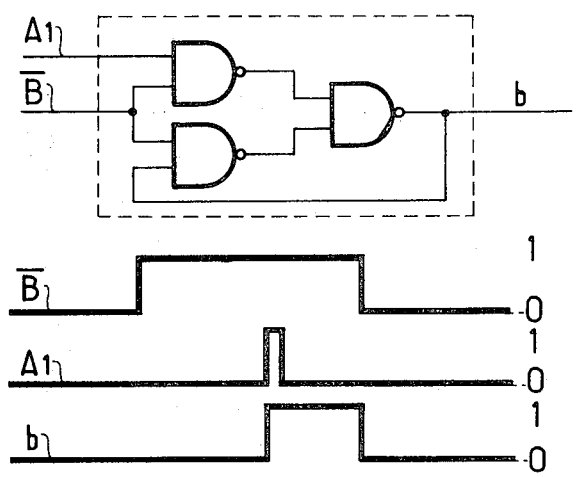

The principle of the present invention will now be further explained in detail with reference to the accompanying drawings, wherein:

FIG. 1 comprises three waveforms which show the result of the phase difference measured for two waves having a cyclic ratio of 1/1 in a first case of phase shifting;

FIG. 2 comprises three waveforms which show the result of the phase difference measured for two waves having a cyclic ratio of 1/1 in a second case of phase shifting;

FIGS. 3 and 4 each comprise three waveforms which are similar to those of FIGS. 1 and 2 but correspond to cases involving waves having different cyclic ratios;

FIG. 5 is a schematic diagram of an apparatus according to the present invention applying the theory expressed in FIGS. 1 to 4, and FIG. 6 is a schematic circuit diagram of one detail of the diagram of FIG. 5, and illustrating three waveforms which aid in explaining the operation of the circuit of FIG. 6.

FIG. 1 illustrates two rectangular waves A and B having a cyclic ratio of 1/1 and on which the rising and descending fronts have been indicated by arrows. The duration of the period of these waves has been designated with reference symbol T. The period $t1$ is the interval which separates a rising front of waveform A from the following descending front of waveform B, or the descending front of waveform A from the following rising front of waveform B. Therefore, waveform A leads waveform B by the time interval $T/2 + t1$.

It is assumed that under these conditions an appropriate circuit, which will be further described hereinbelow, generates a wave $e1$ formed of negative pulses designated alternately $a$ and $b$ and having a uniform level with a width $t1$. The direct-current component of this signal $e1$ is negative and proportional to $t1 : e1 = k.t1$.

In FIG. 2 the two waves A and B are offset in phase but to a different extent from the example of FIG. 1. The period $t2$ is the interval which separates a rising front of waveform B from the following descending front of waveform A, or a descenting front of waveform B from the following rising front of waveform A. Thus, waveform A leads waveform B by the time interval $T/2 - t2$.

It is assumed that under these conditions the same circuit as referred to hereinabove generates a wave $e2$ formed of positive pulses designated alternately c and d and having a uniform level, with a width $t2$. The direct-current component of this signal $e2$ is positive and proportional to $t2 : e2 = k.t2$.

The direct-current component of the signal $e$ (either $e1$ or $e2$) is thus null with respect to the phase opposition between waveforms A and B and passes from a positive value, for example +E, for a zero phase shift to a negative value −E for a phase shift of 360°, with the law of variation between the two being linear.

In the waveform diagram of FIG. 3 it is assumed that the cyclic ratios of the waveforms A and B are different; and specifically, that the ratio of B is greater than that of A. The measuring circuit then furnishes a wave $e3$ formed of positive pulses c alternating with negative pulses b having an equal width. The direct-current component of this signal is zero.

In the example of FIG. 4 it is assumed that the cyclic ratio of waveform A is greater than that of waveform B. The measuring circuit then furnishes a wave $e4$ formed of negative pulses a alternating with positive pulses d having an equal width. The direct-current component of this signal is zero.

Now, in the case of different cyclic ratios, as in the case of cyclic ratios equal to 1/1, the measuring circuit furnishes a zero output current for the phase opposition. One could show without difficulty that the law of variation from 0° to 360° is the same as in the case of equal cyclic ratios.

FIG. 5 illustrates one example of a circuit furnishing signals according to FIGS. 1 and 3. The wave A is applied to an input terminal 1 and the wave B is applied to an input terminal 2. A signal $e$ furnishing a current representing a linear function of the phase shift between the waves A and B is extracted from an output terminal 3.

The circuit includes four monostable flip-flops 11 – 14 furnishing very short pulses (for example, smaller than 5 percent of the shortest period of the waves A and B) having a descending front. The flip-flop 11 receives the signal A directly from terminal 1 and the flip-flop 12 receives the signal $\overline{A}$ through an inverter 15. The flip-flop 13 receives the signal B directly from terminal 2 and the flip-flop 14 receives the signal $\overline{B}$ through an inverter 16. For that reason, the flip-flop 11 furnishes short pulses A1 on the descending fronts of waveform A and the flip-flop 12 furnishes short pulses A2 on the rising fronts of waveform A. The flip-flop 13 furnishes short pulses B1 on the descending fronts of B and the flip-flop 14 furnishes short pulses B2 on the rising fronts of B.

A subassembly 20 comprises three AND circuits with two input gates 21 and 22 and an output gate 23. Gate 21 receives the signal A1 on one input and the signal $\overline{B}$ on the other input which is connected to an input of gate 22. The outputs of gates 21 and 22 are connected to the inputs of gate 23 whose output is connected back to the second input of gate 22.

The subassemblies 30, 40, and 50 are mounted in the same fashion as the subassembly 20 vis-a-vis the signals A2, B1 and B2, respectively. The signal $\overline{B}$ is applied to the common inputs of gates 21 and 22; the signal B is applied to the common inputs of gates 31 and 32; the signal $\overline{A}$ is applied to the common inputs of gates 41 and 42; and the signal A is applied to the common inputs of gates 51 and 52.

A conventional operational amplifier 60 having a negative input 61 and a positive input 62 is connected to the subassemblies 20 – 50. The input 61 is connected to the output $a$ of the subassembly 20 through a resistor 63 and to the output $b$ of the subassembly 30 through a resistor 64. The input 62 is connected to the output $c$ of the subassembly 40 through a resistor 65 and to the output $d$ of the subassembly 50 through a resistor 66.

A negative feedback resistor 67 is connected between the output 3 and the terminal 61 of the operational amplifier 60, and all of the resistors 63 through 67 are preferably equal.

The outputs $a$, $b$, $c$, and $d$ of the subassemblies 20 – 50 correspond to the signals which have been indicated in the drawing FIGS. 1 to 4 by the same designations.

A subassembly, such as 20, is reproduced in FIG. 6. This circuit is known in the art as a validation circuit. Receiving on the one hand a signal $\overline{B}$, a so-called validation signal, and on the other hand a pulse A1 at the inside of the signal B, it furnishes at the output a signal $b$ which lasts from the beginning of the pulse A1 to the end of the validation pulse $\overline{B}$. The forms of the signals $\overline{B}$, A1 and $b$ have been illustrated in FIG. 6. It is understood that equivalent operations are performed by the subassemblies 30, 40, and 50. It can therefore be easily seen that the circuit of FIG. 5 produces the signals described in FIGS. 1, 2, 3, and 4 for the corresponding conditions.

What is claimed is:

1. A phase meter for measuring the phase displacement between a rectangular wave A and a rectangular wave B and providing a direct current voltage varying between a positive maximum value for a measured phase displacement of 0° and a negative maximum value for a phase displacement of 360° in accordance with a linear law of variation, comprising four monostable flip-flops, means responsive to the rectangular waves A and B for providing the respective signals A, $\overline{A}$, B and $\overline{B}$ to the input of a respective monostable flip-flop, four validation circuits each having one input connected to the output of a corresponding monostable flip-flop and another input receiving the signals $\overline{B}$, B, $\overline{A}$ and A, respectively, and an operational amplifier having a negative input terminal connected to the outputs of two of said validation circuits and a positive input terminal connected to the outputs of the other two validation circuits.

2. A phase meter as defined in claim 1 wherein said means responsive to the rectangular waves includes a first input terminal connecting said wave A directly to a first one of said monostable flip-flops, a first inverter connecting said first input terminal to a second one of said monostable flip-flops, a second input terminal connecting said wave B directly to a third one of said monostable flip-flops and a second inverter connecting said second input terminal to the fourth one of said monostable flip-flops.

3. A phase meter as defined in claim 2 wherein each validation circuit includes first, second, and third AND gates each having a pair of inputs, the outputs of said first and second AND gates being connected to the respective inputs of said third AND gate whose output is connected to an input of said second AND gate, the other input of said second AND gate and an input of said first AND gate being connected together to form one input of said validation circuit and the other input of said first AND gate forming the other input of said validation circuit.

4. A phase meter as defined in claim 3 wherein the output of each validation circuit is connected to an input of said operational amplifier through a respective resistor, all of the resistors connected to the inputs of said operational amplifier having an equal value.

5. A phase meter as defined in claim 4 wherein said operational amplifier includes a feedback resistor connected between its output and its negative input terminal, said feedback resistor having the same value as the resistors connected between said validation circuits and the input terminals of said operational amplifier.

6. A phase meter as defined in claim 1 wherein each validation circuit includes first, second, and third AND gates each having a pair of inputs, the outputs of said first and second AND gates being connected to the respective inputs of said third AND gate whose output is connected to an input of said second AND gate, the other input of said second AND gate and an input of said first AND gate being connected together to form one input of said validation circuit and the other input of said first AND gate forming the other input of said validation circuit.

7. A phase meter as defined in claim 1 wherein the output of each validation circuit is connected to an input of said operational amplifier through a respective resistor, all of the resistors connected to the inputs of said operational amplifier having an equal value.

* * * * *